United States Patent [19]
Bergvist

[11] Patent Number: 5,334,622
[45] Date of Patent: Aug. 2, 1994

[54] MECHANICALLY FROTHED PLASTISOLS

[75] Inventor: Robert C. Bergvist, Fort Mill, S.C.

[73] Assignee: Rutland Plastic Technologies, Inc., Pineville, N.C.

[21] Appl. No.: 132,458

[22] Filed: Oct. 6, 1993

[51] Int. Cl.$^5$ ............................................... C08J 9/30
[52] U.S. Cl. ........................................ 521/74; 521/73; 521/78; 521/79
[58] Field of Search ................... 521/73, 74, 78, 79

[56] References Cited

U.S. PATENT DOCUMENTS

| | | | |
|---|---|---|---|
| 3,703,485 | 11/1972 | Fischer | 521/74 |
| 3,970,620 | 7/1976 | Idhe, Jr. | 521/74 |
| 4,301,119 | 11/1981 | Cobbs, Jr. et al. | 521/73 |
| 4,423,161 | 0/1983 | Cobb, Jr. et al. | 521/79 |
| 4,485,520 | 12/1984 | Haudl et al. | 521/74 |

OTHER PUBLICATIONS

Technical Data Book S-38, GE Silicones, "Surfactants for Mechanically Frothed Vinyl Plastisols," pp. 1-4, 8-9.

Joslyn, "Mechanically Frothed PVC Foam Using Silicones: State of the Art Report," parts A,B,C.1.-C.7.,D.-3.-E.2, FIGS. 1-4, Tables I,II,VII,VIII, Graphs 1-4 (1975).

*Primary Examiner*—Morton Foelak
*Attorney, Agent, or Firm*—Timothy R. Kroboth

[57] ABSTRACT

An improved process for production and delivery of a plastisol foam is provided. By the process, plastisol foam is maintained under controlled pressures and conditioned to enhance homogeneity and percent foam. Also provided is a process for intermittently dispensing a fluid such as a plastisol foam, by which drip may be prevented. Additionally provided is novel apparatus for preventing drip.

17 Claims, 2 Drawing Sheets

MECHANICALLY FROTHED PLASTISOLS

BACKGROUND OF THE INVENTION

This invention relates generally to mechanically frothed plastisols, and in particular to mechanically frothed, PVC dispersions.

Although the use of chemical blowing agents is well established for preparing plastisol foams, mechanical frothing techniques are also known. Mechanical frothing involves the use of a continuous roamer or mixing head that mechanically aerates or froths a plastisol prior to delivery. A metering device may control the flow rate of pressurized gas into the metered plastisol stream before entry of the stream into the mixing head, which typically includes an intermeshing stator and rotor. The foam may be dispensed continuously or intermittently.

In intermittently dispensed foam applications, foam may be delivered from the mixing head through a dispensing nozzle by means of a pump and a positive displacement metering device that actuates a dispensing valve. Pressures in excess of about 150 psi, even up to about 200 to 400 psi, are customarily used to open the dispensing valve. An approximately fifty percent loss of foam may typically occur between the mixing head and dispensing nozzle such that even when a high percent foam on an order of about 45% is formed in the mixing head, the percent foam dispensed may be no more than about 15 to 20%.

As illustrated by U.S. Pat. No. 4,423,161 to Cobb, Jr. et al, it is known to maintain a substantially constant composition of a blowing agent in a vapor space above a foamable liquid under a vapor pressure at least equal to the vapor pressure of the foamable liquid, so as to dispense foam of constant foam-volume ratio. Although applicability of such a method to plastisols and the use of a gaseous agent is suggested in this patent, no mention is made of use of a mechanical frothing technique, nor is information given as to the percent foam dispensed or its structural uniformity.

In the production of certain products, it is desirable to dispense a high percent plastisol foam and for the foam to be homogeneous, using an automated process for forming and dispensing the foam. However, to achieve a high percent plastisol foam with a chemical blowing agent is costly; moreover, uniformity of the foam would be difficult to obtain. Also, in intermittently dispensing a fluid such as a foam, drip from a dispensing head may deleteriously affect the shot size and quality of product. In the case of a low viscosity fluid, drip becomes more difficult to prevent.

Accordingly, there is a need for an automated process for production and delivery of a high percent plastisol foam, and in particular a homogeneous, high percent plastisol foam, using mechanical frothing. To achieve such a foam, it will be advantageous to determine the causes of loss of percent foam and to overcome or avoid the causes. Moreover, for safety reasons, it will be beneficial to maintain the processing pressure below about 100 psi. Furthermore, when it is important for the shot delivered to be constant, an improved technique for preventing drip from a dispensing head would be advantageous. Beneficially, such a technique would reduce waste.

SUMMARY OF THE INVENTION

It is accordingly an object of the present invention to provide an automated process for production and delivery of a high percent plastisol foam using mechanical frothing.

It is a further object to minimize loss of percent foam.

It is an even further object to maintain the processing pressure below about 100 psi.

It is a still further object to provide a homogeneous foam.

It is an additional object to provide an improved technique for preventing drip from a dispensing head.

It is an even additional object for the drip-prevention technique to prevent waste and improve processing.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, an improved process for production and delivery of a plastisol foam is provided. By the process, a plastisol is mechanically frothed under a pressure in excess of atmospheric pressure. Thereafter, while maintaining the resulting raw foam under a pressure in excess of atmospheric pressure, the raw foam is introduced into a suitable container. Subsequently, the raw foam is conditioned by agitation and under a pressure in excess of the vapor pressure of the foam. Until dispensed, the foam is maintained under a pressure in excess of the vapor pressure. As a result, a conditioned, pressurized foam is dispensed.

Beneficially, the conditioning step is carried out at a pressure of from approximately 70 to 90 psi, and processing pressures are maintained at less than about 100 psi. When used for intermittently dispensing foam, the process preferably prevents drip from a dispensing head.

Also provided is a process for intermittently dispensing a fluid such as a plastisol foam. By this process, drip from a dispensing head is prevented by application of negative pressure from a piston-actuated, vacuum cylinder subsequent to dispensing. Thereafter, captured fluid is beneficially dispensed from the vacuum cylinder during a subsequent dispensing step.

Additionally provided is a preferred apparatus for carrying out the process for intermittently dispensing a fluid. This apparatus includes a dispensing valve in fluid communication with a dispensing head, a device for controlling the dispensing valve, and a piston-actuated, vacuum cylinder in fluid communication with the dispensing head.

In the drawing and in the detailed description of the invention that follows, there is shown and essentially described only a preferred embodiment of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts a preferred embodiment of an improved process and apparatus in accordance with the present invention.

DETAILED DESCRIPTION OF THE INVENTION

The present invention is useful for producing and delivering mechanically frothed plastisols characterized by high percent foam; however, as one skilled in the art will understand, this invention is not limited to dispensing high percent foam. By "high percent foam" is meant in excess of about 25% foam, preferably in excess of about 40 to 45% foam. In achieving this objective, loss of percent foam is minimized, and to this end, foamed material is advantageously not exposed to atmospheric pressure until dispensed. Additionally, foamed material is beneficially not subjected to a processing pressure in excess of about 100 psi or mechanically compacted.

The present invention is useful for continuously or intermittently dispensing mechanically frothed plastisols, and may advantageously be used to produce a highly homogeneous, microcellular, plastisol foam. The present invention is particularly useful for dispensing mechanically frothed, low viscosity plastisols. Foam made from a low viscosity plastisol beneficially has good flow and mold-conforming characteristics. By "low viscosity" is meant less than about 20,000 cps at approximately 80° F.

By the term "plastisol" is meant a dispersion of a suitable polymeric substance in a liquid plasticizer. A commonly used polymeric substance for making plastisols is polyvinyl chloride and its copolymers. Plastisols typically contain additive agents such as stabilizers, pigments, fillers and processing aids.

Figure 1:
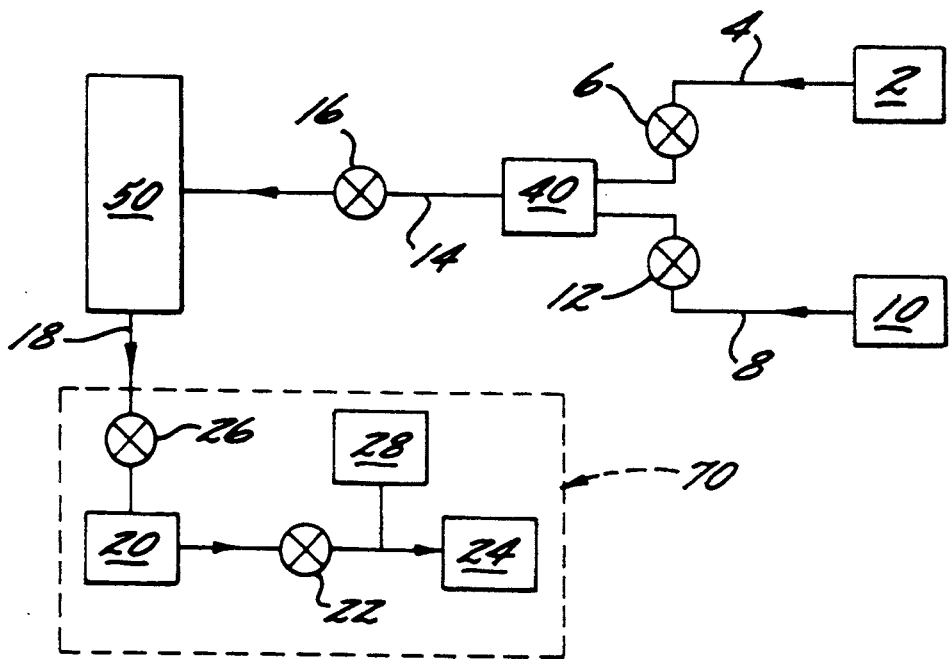
FIG. 1 is a block diagram depicting a preferred process in accordance with the present invention for foam forming, conditioning and dispensing.

Referring to FIG. 1, a bulk fluid source 2 of a plastisol is connected via a line 4, to a mechanical frothing apparatus 40. Beneficially, an in-line flow regulator valve 6 provides a suitable flow rate for delivery of the plastisol. Connected via a line 8 to the mechanical frothing apparatus is a bulk source 10 of a suitable pressurized gas, having its output metered and controlled by a control device 12. Advantageously, the plastisol and gas outputs are adjusted relative to each other to provide an appropriate blend for processing. Beneficially, control device 12 may provide pulsed delivery of the pressurized gas.

Pressurized gases useful in mechanical frothing are well known, and include inert gases such as nitrogen. Other commonly used gases include dry air and carbon dioxide. Within the frothing apparatus, raw plastisol foam is beneficially formed under a pressure in excess of atmospheric pressure, with the particular pressure depending in part upon the pressure at which the pressurized gas is delivered.

With continuing reference to FIG. 1, while being maintained under a pressure in excess of atmospheric pressure, the raw foam is passed from the frothing apparatus via a line 14, which conveniently includes a valve 16, to a conditioning apparatus 50. Within apparatus 50, the raw foam is conditioned to improve foam homogeneity and the percent foam. During its period of residence within the conditioning apparatus, the foam is further pressurized. Conditioned foam under increased pressure, is thereafter passed from the conditioning apparatus to a dispensing apparatus 70 via a line 18.

With continued reference to FIG. 1, dispensing apparatus 70 beneficially includes a device 20 for control of a dispensing valve 22, which communicates with a head 24 for dispensing conditioned, pressurized foam. A conventional valve 26 advantageously located between control device 20 and the conditioning apparatus, prevents foam backflow. Disposed between and in fluid communication with the dispensing valve and dispensing head, is a device 28 for preventing drip of foam from the dispensing head.

Figure 2:
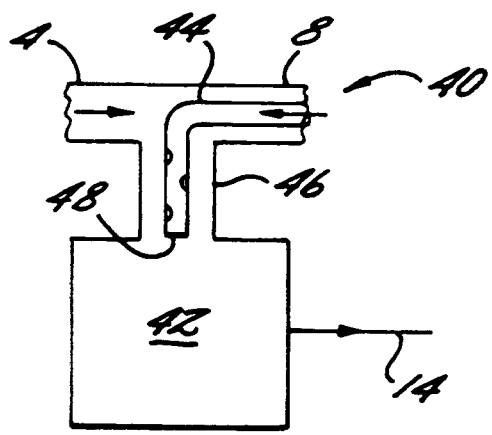
FIG. 2 shows further details of a preferred foam-forming apparatus of FIG. 1.

With reference now to FIG. 2, pressurized gas is beneficially delivered into the metered plastisol stream prior to entry of the stream into a continuous roamer or mixing head 42, which suitably includes an intermeshing stator and rotor (not shown). To this end, input lines 4,8 conveniently converge prior to the mixing head, and a perforated tube 44 in communication with the source of gas, beneficially extends into a line 46 formed by the convergence, and to a location at or near the inlet port of the mixing head. Advantageously, pulsed delivery of gas in combination with the gas output selected and perforated tube 44 for bubbling gas into the plastisol stream, provides for control of gas flow and assists mixing of gas and plastisol so as to avoid "blow by" of gas through the frothing apparatus, reduce waste of gas, and provide highly uniform flow of raw foam from the frothing apparatus. With regard to tube 44, these objectives may be aided by an end 48 thereof being closed and/or the size and number of apertures selected for the peripheral wall of the tube.

As indicated, to obtain reproducibility in the processing and a desired pressure within the mixing head, the flow rates of the plastisol and pressurized gas should be carefully controlled and selected with respect to one another. As will be understood by one skilled in the art, these flow rates will vary considerably depending upon processing variables such as the particular plastisol and pressurized gas, and product specifications.

Advantageously, the plastisol is frothed under a pressure within the mixing head in excess of atmospheric pressure. As a result, an appropriate pressure is provided to assist in forming and maintaining the raw foam, and to drive the raw foam to the conditioning apparatus. Suitably, this pressure may range from about 15 to 25 psi above atmospheric pressure.

In a continuous roamer, there is continuous output of raw foam. However, even so, a residence time of thirty seconds to one minute within the foamer may be expected. If desired for processing enhancement such as to increase the percent foam, the residence time may be increased.

Figure 3:
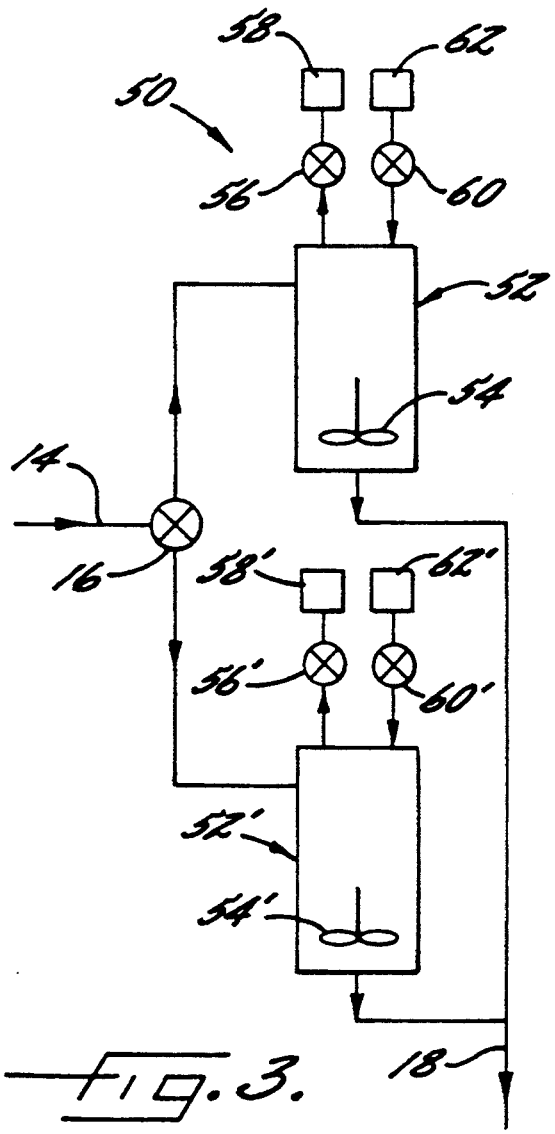
FIG. 3 shows further details of a preferred foam-conditioning apparatus of FIG. 1.

In FIG. 3, for sake of brevity, corresponding numbers are used to indicate corresponding parts. With reference now to FIG. 3, raw foam is admitted into a conditioning tank 52 from line 14 via flow-directing valve 16. The inlet port of the tank is suitably located in an upper portion of the tank. Advantageously, agitation is provided by agitator blades 54, and system pressure, more particularly the pressure within mixing head 42, is used to pass the foam to the conditioning tank. As necessary, excess pressure is released from the conditioning tank via a pressure release valve 56 to permit foam inflow; however, a residual pressure is beneficially maintained in the tank during the filling step, sufficient to keep the raw foam under a pressure in excess of atmospheric pressure. The residual pressure will conveniently be less than the pressure within the mixing head, and will typically range from about 6 to 15 psi above atmospheric pressure, with about 8 to 12 psi being particularly suitable. A pressure gauge 58 in communication with the pressure release valve, enables the tank pressure to be monitored.

When the tank has been filled to a suitable capacity, the raw foam is further pressurized via a pressurizing valve 60 by admitting a pressurized gas such as nitrogen or air. The pressurization is beneficially to a pressure in excess of the vapor pressure of the foam. As a result, individual foam cells are compressed and processing is assisted. Advantageously, the increase in pressure may subsequently be used to drive conditioned foam to the dispensing apparatus. Beneficially, a pressure in the range of about 50 to 90 psi may be employed, with a pressure of from about 70 to 90 psi being generally preferred; however, a suitable pressure will, of course, depend upon variables including the particular plastisol and pressurized gas. Reduction in processing time may advantageously result. Tank 52 is constructed so as to be able to withstand the pressure utilized.

Advantageously, agitation is provided during the residence time of the foam within the conditioning tank. Generally speaking, agitation is suitably by low speed, propeller blades, whereby the foam is under low shear conditions. By comparison, high speed agitation or high shear may increase heat within the tank, and if sufficient moisture is admitted into the tank, may blend the moisture into the foam, with in either case potential detrimental effect.

Although an increase in percentage foam and improvement in homogeneity and hence uniformity of cell structure of the product may be expected with relatively more residence time, a residence time of as little as about 2 hours may be sufficient to provide a commercially acceptable product. However, processing may be benefited by a residence time in excess of 2 hours and even up to about 24 hours. It has been advantageously found that by maintaining agitation of the foam, the conditioning tank may serve as holding tank for in excess of about 24 hours, even up to about 48 hours, with no significant loss of foam quality.

It will be understood that an appropriate residence time for raw foam will be dependent upon factors including the particular plastisol and pressurized gas selected, the relative quantities of each, the type of agitation used in the conditioning tank, and commercial requirements for the product. It will typically be an objective to dispense a homogeneous foam having uniformity of cell structure, and the residence time will generally also be selected to provide reproducibility of the processing including the desired percent foam.

Conveniently, mixing head 42 may via flow-directing valve 16, pass raw foam to a second conditioning tank 52' similar to conditioning tank 52, while tank 52 is dispensing conditioned foam. In this way, one tank may be used for dispensing conditioned foam, and at the same time, foam may be conditioned in the other tank.

With pressurizing valve 60 open to maintain a constant pressure head in the conditioning tank under control of a pressure-sensing device 62 in communication with valve 60, pressurized, conditioned foam is delivered from the tank. Advantageously, the foam is delivered from a lower portion of the tank, and to this end, may be ported from the bottom of the tank to delivery line 18. A constant pressure head beneficially assists processing, with a significant processing advantage being that a constant flow rate through line 18 is maintained.

System pressure, in particular the pressure head within the conditioning tank, is beneficially used to feed the pressurized, conditioned foam to dispensing apparatus 70. As understood by one skilled in the art, pressure drop occurs between the tank and dispensing valve 22, and is dependent upon factors including the diameter of the foam delivery line and distance.

Figure 4:
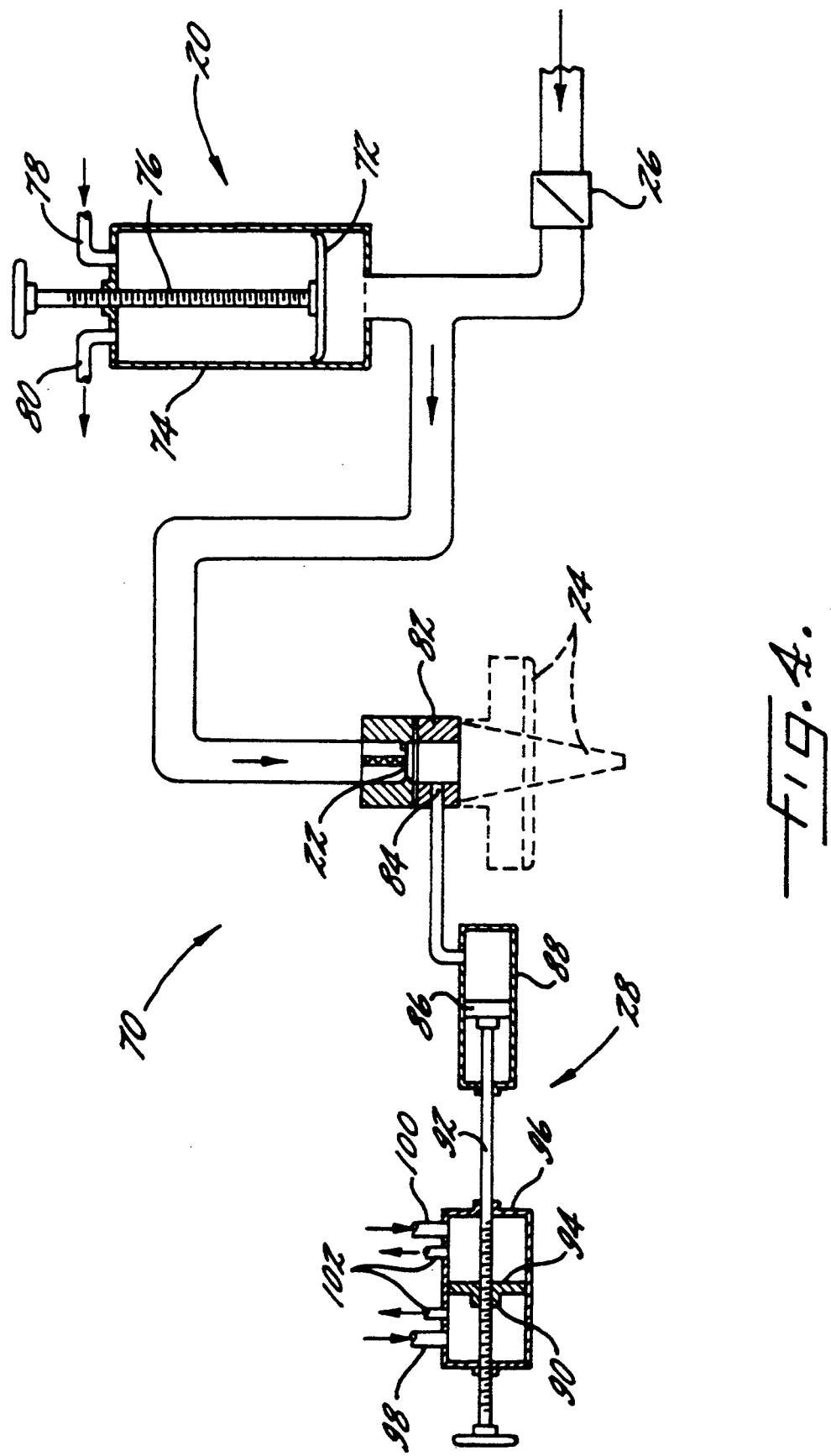
FIG. 4 is a detailed view of a preferred foamdispensing apparatus of FIG. 1.

With reference to FIG. 4, device 20 for control of dispensing valve 22, is advantageously a conventional offset multimeter. Offset multimeter 20 includes an air pressure-driven piston 72 within a cylinder 74, and a screw 76 for adjusting the travel of the piston and thus control of the shot size. Pressure for travel of the piston is controlled via pressure input line 78 and pressure output line 80, and by pressure within the foam delivery line. Upon downstroke of the piston, control device 20 sufficiently increases the delivery line pressure above that provided by system pressure, to cause the dispensing valve to open, whereupon a shot of conditioned foam is released.

Dispensing valve 22 may beneficially be a conventional poppit valve, which includes adjustment means (not shown) for setting the pressure at which the valve will open. Connection between the dispensing valve and dispensing head 24 is advantageously provided by a collar 82 having a port 84 in its peripheral wall for fluid communication with anti-drip device 28. The dispensing head is shown in phantom in alternative forms as either a nozzle or showerhead.

The anti-drip device beneficially includes an air pressure-driven piston 86 disposed within a cylinder 88, and in operation, backstroke of the piston creates negative pressure that prevents drip from the dispensing head. When the dispensing valve opens, piston 86 moves forward beneficially dispensing foam captured within cylinder 88 on the backstroke. Advantageously, forward motion of the piston and opening of the dispensing valve may be simultaneously actuated by a timing device (not shown).

Travel of the piston is suitably adjustable by means of an adjustment nut 90 disposed on a threaded shaft 92 that passes through a wall member 94 situated within a cylinder 96, and that is secured to the piston. Forward travel of piston 86 results from pressure applied through inlet 98 and rearward travel results from pressure applied through inlet 100. Outlets 102 provide for pressure release.

As can be understood, an anti-drip device in accordance with the present invention, has broader applicability than with respect to dispensing plastisol foams. Such a device is useful for any type of intermittent dispensing, and is particularly useful in the dispensing of a low viscosity fluid.

After being dispensed, the foamed material is solidified in accordance with conventional procedures. If appropriate, an oven may be used for solidification. In this way, a microcellular foam having uniform, closed cell structure may be formed, and enhanced compression recovery may beneficially result.

Thus, by the present invention, raw foam is pressurized so as to be under, and thereafter conditioned and maintained under, a pressure above the vapor pressure of the foam, preferably significantly above the vapor pressure, yet not so great as to break the foam. Moreover, premature exposure of the foam to atmospheric pressure, use of a pump, or use of a positive displacement ram is advantageously avoided. As a result, loss of percent foam is minimized, and high percent, plastisol foam may be dispensed.

EXAMPLE

Referring again to the drawing, PVC plastisol supply container 2, having a capacity of 1500 gallons, is connected via line 4, to mechanical frothing apparatus 40. Beneficially, in-line flow regulator valve 6 provides a flow rate of about 23 gal./min. Connected via line 8 to the frothing apparatus is pressurized nitrogen cylinder 10, which is set to provide a 30 psi output. Conventional control device 12 provides for pulsed delivery of nitrogen at a rate of about 1.5 shots per second.

Nitrogen is beneficially delivered into the metered plastisol stream via perforated tube 44, and the mixture enters continuous mixing head 42, which has a capacity of about one half to one gallon. Within the mixing head, plastisol is mechanically frothed under a pressure of about 20 psi above atmospheric pressure.

While maintaining the resulting raw foam under a pressure in excess of atmospheric pressure, the raw foam is passed from the frothing apparatus under the pressure head provided by mixing head 42, to conditioning tank 52, which has a fifty-five gallon capacity. Advantageously, agitation is provided within tank 52 by agitator blades 54, and as necessary, excess pressure is released from tank 52 via pressure release valve 56 to maintain a pressure of about 10 psi above atmospheric pressure, thereby permitting raw foam inflow.

When the tank has been filled to a suitable capacity, the raw foam is further pressurized beneficially to a pressure of about 80 psi by admitting pressurized air to the tank via pressurizing valve 60, and is conditioned under this increased pressure. Advantageously, low speed agitation is provided during the conditioning, which suitably lasts about two hours.

Thereafter, with pressurizing valve 60 open to maintain a pressure head of 80 psi, pressurized, conditioned foam is advantageously delivered from the tank to the dispensing apparatus under the pressure head within the conditioning tank and by means of a 1 ¼" diameter line. With the dispensing valve 22 set to open at about 55–60 psi and with a delivered pressure to the valve of roughly about 50 psi as a result of pressure drop, offset multimeter 20 actuates valve opening by temporarily increasing the line pressure above the dispensing valve, opening pressure, and regulates the shot size. The percent foam dispensed is approximately 40%.

After the dispensing valve closes, a backstroke of piston 86 of the anti-drip device creates a negative vacuum that prevents drip of the foam. On the subsequent opening of the dispensing valve, a forward stroke of the piston advantageously discharges the captured foam. After being dispensed, the foamed PVC plastisol is solidified by application of heat.

Having described the invention in detail and by reference to a preferred embodiment thereof, it will be apparent that modifications and variations are possible without departing from the scope of the invention defined in the appended claims. Several variants or modifications have been briefly mentioned for purposes of illustration.

I claim:

1. A process for production and delivery of a plastisol foam comprising mechanically frothing a plastisol under a pressure in excess of atmospheric pressure; while maintaining the resulting raw foam under a pressure in excess of atmospheric pressure, introducing the raw foam into a suitable container; thereafter, conditioning said raw foam by agitation and under a pressure in excess of the vapor pressure of the foam; maintaining the foam under a pressure in excess of said vapor pressure, until the foam is dispensed; and dispensing a conditioned, pressurized foam.

2. The process of claim 1, wherein said plastisol is mechanically frothed using pressurized nitrogen.

3. The process of claim 1, wherein agitation is provided as said raw foam is introduced into said suitable container.

4. The process of claim 1, wherein said raw foam is maintained under a pressure of about 6 to 15 psi above atmospheric pressure, while being introduced into said container.

5. The process of claim 1, wherein said pressure in excess of said vapor pressure, is provided by pressurized air.

6. The process of claim 1, wherein said pressure in excess of said vapor pressure, is in the range of about 70 to 90 psi.

7. The process of claim 1, comprising maintaining a substantially constant pressure head in said container during said dispensing.

8. The process of claim 1, wherein said conditioned foam is dispensed at a dispensing valveactuating pressure of more than about 50 psi.

9. The process of claim 1, wherein processing pressures are maintained at less than about 100 psi.

10. The process of claim 1, wherein said conditioned foam is continuously dispensed.

11. The process of claim 1, wherein said conditioned foam is intermittently dispensed.

12. The process of claim 11, further comprising preventing drip after said dispensing.

13. The process of claim 12, wherein drip is prevented by application of negative pressure from a piston-actuated, vacuum cylinder subsequent to said dispensing.

14. The process of claim 13, comprising dispensing captured foam from said vacuum cylinder during a subsequent dispensing step.

15. The process of claim 1, wherein said plastisol is a PVC plastisol.

16. A process for intermittently dispensing a fluid, comprising preventing drip from a dispensing head by application of negative pressure from a piston-actuated, vacuum cylinder subsequent to said dispensing.

17. The process of claim 16, comprising dispensing captured fluid from said vacuum cylinder during a subsequent dispensing step.

* * * * *